US012380865B2

(12) United States Patent
Chen et al.

(10) Patent No.: US 12,380,865 B2
(45) Date of Patent: Aug. 5, 2025

(54) COCKPIT DISPLAY SYSTEM

(71) Applicant: AUO Corporation, Hsin-Chu (TW)

(72) Inventors: Yu-Chi Chen, Hsin-Chu (TW); Teng-Ying Huang, Hsin-Chu (TW); Chih-Hsiang Liu, Hsin-Chu (TW); Li-Heng Hsu, Hsin-Chu (TW); Chi-Yu Liu, Hsin-Chu (TW); Tsung-Hsiung Wang, Hsin-Chu (TW); Chia-Sheng Cheng, Hsin-Chu (TW)

(73) Assignee: AUO CORPORATION, Hsin-Chu (TW)

(*) Notice: Subject to any disclaimer, the term of this patent is extended or adjusted under 35 U.S.C. 154(b) by 0 days.

(21) Appl. No.: 18/391,898

(22) Filed: Dec. 21, 2023

(65) Prior Publication Data
US 2024/0386854 A1    Nov. 21, 2024

Related U.S. Application Data

(60) Provisional application No. 63/467,416, filed on May 18, 2023.

(30) Foreign Application Priority Data

Aug. 31, 2023    (TW) .................................. 112133027

(51) Int. Cl.
G09G 3/34        (2006.01)
B60K 35/215      (2024.01)
(Continued)

(52) U.S. Cl.
CPC ......... G09G 3/3406 (2013.01); B60K 35/215 (2024.01); B60K 35/22 (2024.01);
(Continued)

(58) Field of Classification Search
CPC ............... G09G 2300/026; G09G 5/14; G09G 2300/00; G09G 2300/02; G09G 2360/144;
(Continued)

(56) References Cited

U.S. PATENT DOCUMENTS

2012/0327104 A1* 12/2012 Schrauben ............. G01C 23/00
                                                          345/619
2017/0334291 A1* 11/2017 Fujita ................... H04N 9/3182
(Continued)

FOREIGN PATENT DOCUMENTS

CN          107277903 A      10/2017
CN          111179881 A       5/2020
(Continued)

OTHER PUBLICATIONS

Office Action issue by (TIPO) Taiwan Intellectual Property Office Ministry of Economic Affairs R.O.C., Apr. 26, 2024, for Application No. 112133027, Tawian.

Primary Examiner — Sanjiv D. Patel
(74) Attorney, Agent, or Firm — Tim Tingkang Xia, Esq.; Troutman Pepper Locke LLP

(57) ABSTRACT

A cockpit display system includes a cockpit, a first display apparatus, a second display apparatus, a first light sensor, a second light sensor and a brightness distribution calculation module. The first light sensor is suitable for detecting a first ambient light brightness. The second light sensor is suitable for detecting a second ambient light brightness. The brightness distribution calculation module is suitable for respectively calculating a first brightness, a second brightness, a third brightness and a fourth brightness of the first display area and the second display area of the first display apparatus and the third display area and the fourth display area of the second display apparatus under a same display gray level according to the first ambient light brightness and the second (Continued)

ambient light brightness. The first brightness, the second brightness, the third brightness and the fourth brightness are different from each other.

20 Claims, 20 Drawing Sheets

(51) Int. Cl.
    *B60K 35/22*       (2024.01)
    *B60K 35/234*     (2024.01)
    *B60K 35/235*     (2024.01)
    *B60K 35/65*      (2024.01)
    *G02B 27/01*      (2006.01)
    *G06F 3/01*       (2006.01)
    *G06F 3/04886*    (2022.01)

(52) U.S. Cl.
    CPC .......... *B60K 35/234* (2024.01); *B60K 35/235* (2024.01); *B60K 35/654* (2024.01); *G02B 27/0101* (2013.01); *G02B 27/0179* (2013.01); *G06F 3/013* (2013.01); *G06F 3/04886* (2013.01); *B60K 2360/149* (2024.01); *B60K 2360/182* (2024.01); *B60K 2360/343* (2024.01); *B60K 2360/349* (2024.01); *G02B 2027/0118* (2013.01); *G02B 2027/0187* (2013.01); *G09G 2320/0606* (2013.01); *G09G 2320/0613* (2013.01); *G09G 2320/0626* (2013.01); *G09G 2320/0693* (2013.01); *G09G 2340/0464* (2013.01); *G09G 2354/00* (2013.01); *G09G 2360/144* (2013.01); *G09G 2360/145* (2013.01); *G09G 2360/16* (2013.01); *G09G 2380/10* (2013.01)

(58) Field of Classification Search
    CPC ........ G09G 2360/145; G09G 2360/147; G06F 3/1446; B60K 2360/343; B60K 2360/182; B60K 2360/349; B60K 35/234
    See application file for complete search history.

(56) References Cited

U.S. PATENT DOCUMENTS

2020/0227005 A1*  7/2020  Zhang .................. H04M 1/725
2021/0350765 A1   11/2021  Mi
2022/0310035 A1*  9/2022  Jia ............................ G09G 3/20

FOREIGN PATENT DOCUMENTS

| | | | | |
|---|---|---|---|---|
| CN | 111916036 A | * | 11/2020 | ............... G09G 5/10 |
| CN | 112102791 A | | 12/2020 | |
| CN | 112509526 A | * | 3/2021 | .......... G09G 3/3406 |
| CN | 115206248 A | | 10/2022 | |
| CN | 217690403 U | * | 10/2022 | |
| CN | 112829584 B | * | 11/2022 | ............. B60K 35/00 |
| CN | 115662365 A | | 1/2023 | |
| CN | 115809105 A | | 3/2023 | |
| CN | 117409738 A | * | 1/2024 | .......... G09G 3/3406 |
| DE | 102022210843 A1 | * | 4/2024 | |
| TW | 202014771 A | | 4/2020 | |

* cited by examiner

COCKPIT DISPLAY SYSTEM

CROSS-REFERENCE TO RELATED PATENT APPLICATION

This non-provisional application claims priority to and the benefit of, pursuant to U.S.C. § 119 (e), U.S. provisional patent application Ser. No. 63/467,416 filed May 18, 2023. This non-provisional application also claims priority to and the benefit of, pursuant to 35 U.S.C. § 119 (a), patent application No. 112133027 filed in Taiwan on Aug. 31, 2023. The disclosure of each of the above applications is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to a display system, and particularly to a cockpit display system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The display device in the automotive field has become increasingly prominent as the display technology matures. In recent years, in some high-end car models available on the market, traditional dashboards, rearview mirrors, or center consoles are gradually being replaced by flat or curved display devices. With the continuous increase in the size of the in-car display devices, the control of screen brightness has a significant impact on the driving comfort. For example, in the process of driving, changes in the external ambient light source may sometimes cause the in-car display device to be unclear due to the strong external light, or the screen brightness may be too glaring in dim environments and thus affecting driving safety. In addition, the existing in-car display device often require the driver to manually adjust the brightness, and the available brightness settings are limited, unable to meet the needs of various operating scenarios.

SUMMARY

One aspect of the present disclosure provides a cockpit display system, which may have better display performance in scenarios with different ambient light distributions.

The cockpit display system according to one aspect of the present disclosure includes a cockpit, a first display apparatus, a second display apparatus, a first light sensor, a second light sensor and a brightness distribution calculation module. The first display apparatus and the second display apparatus are disposed side-by-side in the cockpit along an arrangement direction. The first display apparatus has a first display area and a second display area. The second display apparatus has a third display area and a fourth display area. The second display area is located between the first display area and the third display area. The third display area is located between the second display area and the fourth display area. The first light sensor and the second light sensor are arranged along the arrangement direction, and are configured to respectively detect a first ambient light brightness and a second ambient light brightness. The brightness distribution calculation module is configured to respectively calculate a first brightness, a second brightness, a third brightness and a fourth brightness of the first display area, the second display area, the third display area and the fourth display area under a same first display gray level according to the first ambient light brightness and the second ambient light brightness. When the first ambient light brightness is different from the second ambient light brightness, the first brightness, the second brightness, the third brightness and the fourth brightness are different from each other.

Based on the foregoing, in the cockpit display system according to one embodiment of the present disclosure, the first light sensor disposed at a side of the first display apparatus and the second light sensor disposed at a side of the second display apparatus are suitable for detecting the surrounding ambient light brightness. The brightness distribution calculation module may calculate the brightnesses of the display areas of the first display apparatus and the second display apparatus under the same display gray level according to the first ambient light brightness and the second ambient light brightness detected by the two light sensors. Since the relationship of the brightnesses of the display areas changes according to the relationship between the first ambient light brightness and the second ambient light brightness, it can effectively improve the display quality of the cockpit display system under different ambient light sources, thereby optimizing the visual experience of the user.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
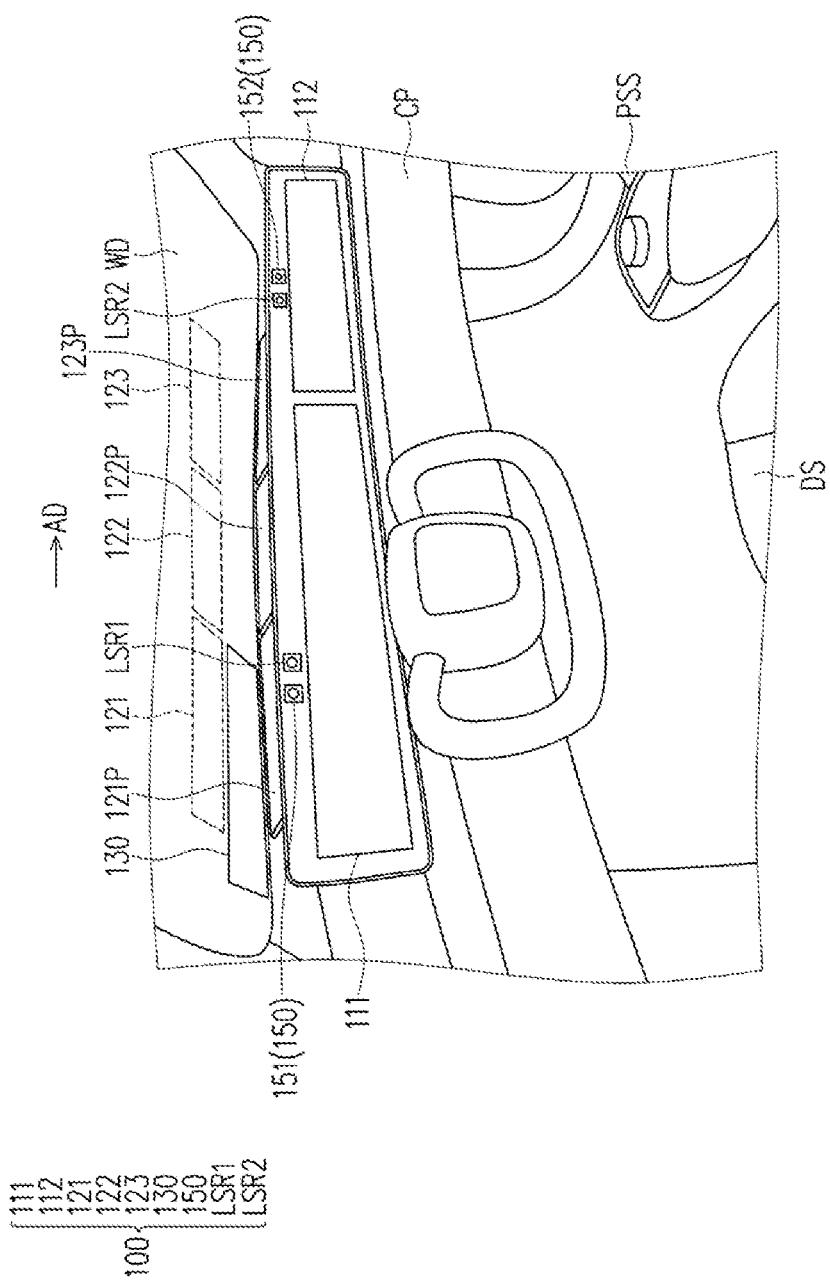
FIG. 1 is a schematic view of a cockpit display system according to one embodiment of the present disclosure.

The terms "about", "approximately", "essentially" or "substantially" as used herein shall cover the values described, and cover an average value of an acceptable deviation range of the specific values ascertained by one of ordinary skill in the art, where the deviation range may be determined by the measurement described and specific quantities of errors related to the measurement (that is, the limitations of the measuring system). For example, the term "about" represents within one or more standard deviations of a given value of range, such as within +30 percent, within +20 percent, within +15 percent, within +10 percent or within +5 percent. Moreover, the terms "about", "approximately", "essentially" or "substantially" as used herein may selectively refer to a more acceptable deviation range or the standard deviation based on the measuring characteristics, the cutting characteristic or other characteristics, without applying one standard deviation to all characteristics.

In the accompanying drawings, for clarity purposes, the thickness of a layer, a film, a panel, a region, etc. may be enlarged. It should be understood that when one component such as a layer, a film, a region or a substrate is referred to as being disposed "on" the other component or "connected to" the other component, the component may be directly disposed on the other component or connected to the other component, or an intermediate component may also exist between the two components. In contrast, when one component is referred to as being "directly disposed on the other component" or "directly connected to" the other component, no intermediate component exists therebetween. As used herein, a "connection" may be a physical and/or electrical connection. In addition, when two components are "electrically connected", other components may exist between the two components.

Furthermore, relative terms, such as "lower" or "bottom", "upper" or "top", and "left" and "right", may be used herein to describe the relationship between one component and the other component as illustrated in the drawings. It should be understood that the relative terms are intended to encompass different orientations of the device in addition to the orientation in the drawings. For example, if the device in one of the drawings is turned over, components described as being on the "lower" side of other components would then be oriented on "upper" sides of the other components. The exemplary term "lower" can therefore encompasses both an orientation of "lower" and "upper," depending on the particular orientation of the accompanying drawings. Similarly, if the device in one of the drawings is turned over, components described as "below" or "beneath" other components would then be oriented "above" the other components. The exemplary terms "below" or "beneath" can therefore encompass both an orientation of being above and below.

Herein, exemplary embodiments are described with reference to sectional views of schematic diagrams of ideal embodiments. Therefore, changes of shapes in the drawings that are used as results of manufacturing technology, tolerances and/or the like may be expected. Therefore, herein, the embodiments should not be explained to be limited to particular shapes of regions herein, but instead, comprise shape deviations caused by manufacturing and the like. For example, regions that are shown or described to be flat may usually have rough and/or nonlinear features. In addition, a shown acute angle may be rounded. Therefore, regions in the drawings are essentially schematic, and shapes of the regions are not intended to show precise shapes of the regions and are not intended to limit the scope of the claims.

The present disclosure will now be described hereinafter in details with reference to the accompanying drawings, in which exemplary embodiments of the disclosure are shown. Whenever possible, identical reference numerals refer to identical or like elements in the drawings and descriptions.

Figure 2:
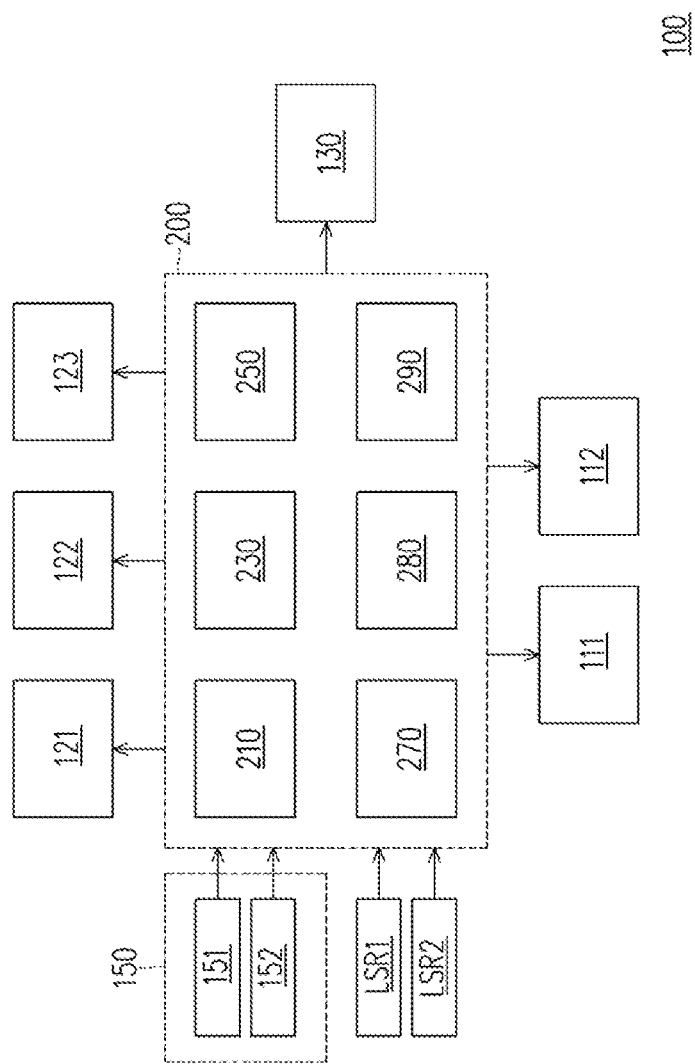
FIG. 2 is a block diagram of the cockpit display system of FIG. 1.
Figure 3:
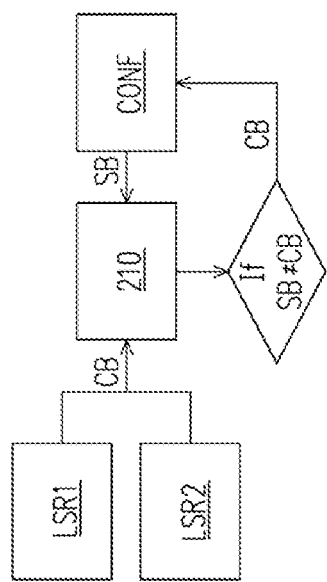
FIG. 3 is a flowchart of the calibration module of the cockpit display system of FIG. 2 in operation.

FIG. 1 is a schematic view of a cockpit display system according to one embodiment of the present disclosure. FIG. 2 is a block diagram of the cockpit display system of FIG. 1. FIG. 3 is a flowchart of the calibration module of the cockpit display system of FIG. 2 in operation. Referring to FIG. 1 and FIG. 2, the cockpit display system 100, which is suitable for installing in the cockpit CP includes a first display apparatus 111, a second display apparatus 112, a plurality of head-up display devices and a transparent display device 130. In the present embodiment, the cockpit CP may be, for example, a car cockpit, without being limited thereto. In other embodiments, the cockpit may be a simulator cockpit or a computer cockpit.

The first display apparatus 111 is disposed in front of the driver's seat DS in the cockpit CP, and may function as a car dashboard. That is, the first display apparatus 111 is suitable for displaying vehicle information such as vehicle speed, power consumption, engine speed and dashboard lights, without being limited thereto. The second display apparatus 112 is disposed in front of the passenger seat PSS in the cockpit CP, and is suitable for displaying interactive contents that may be operated by the passenger (or a co-pilot). In other words, the first display apparatus 111 and the second display apparatus 112 are disposed side-by-side in the cockpit CP along the arrangement direction AD of the driver's seat DS and the passenger seat PSS.

The head-up display devices are disposed above the first display apparatus 111, and are suitable for displaying navigation information, driving information (such as warning signs and distance markers) or other image information either in a stitching manner or independently on a see-through window WD of the cockpit CP. In the present embodiment, the quantity of the head-up display devices of the cockpit display system 100 may be three, including a first head-up display device 121, a second head-up display device 122 and a third head-up display device 123, without being limited thereto. For example, the first head-up display device 121, the second head-up display device 122 and the third head-up display device 123 respectively have a first projection machine 121P, a second projection machine 122P and a third projection machine 123P. The projection machines are disposed on a platform behind the first display apparatus 111 and the second display apparatus 112, and project images toward the see-through window WD.

Figure 12:
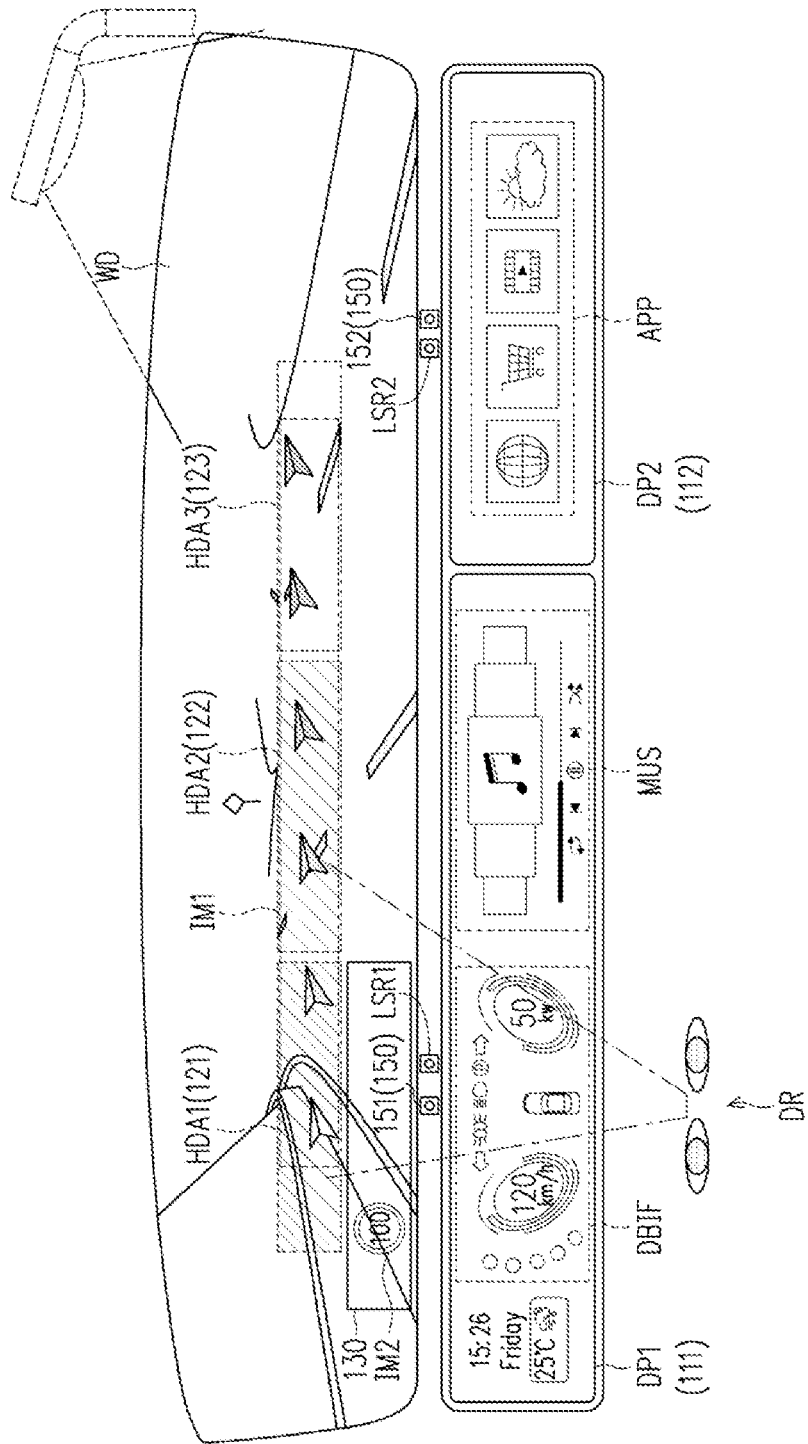
FIG. 12 is a schematic view of the head-up display devices of FIG. 1 under streetlight illumination.

The transparent display device 130 is disposed to overlap with the see-through window WD of the cockpit CP, and is suitable for display the image information IM2 in FIG. 12. The image information IM2 includes, for example, driving speed limits, vehicle gear positions, vehicle speed or other driving information, without limited thereto. In the present embodiment, the transparent display device 130 may be located between the projection ranges of the three projection machines on the see-through window WD and the first display apparatus 111.

In the present embodiment, the display sizes of the first display apparatus 111, the second display apparatus 112, the head-up display devices and the transparent display device 130 may respectively be, for example, 30.4 inches, 21.6 inches, 10.3 inches and 15.5 inches, without being limited thereto.

Further, the cockpit display system 100 further includes a control unit 200, which is electrically connected to the first display apparatus 111, the second display apparatus 112, the first head-up display device 121, the second head-up display device 122, the third head-up display device 123 and the transparent display device 130.

In the present embodiment, the control unit 200 may be a cockpit domain controller (CDC), which has high-performance computing capabilities and is suitable for executing various algorithms to implement the functions of actively adjusting the display screens.

It should be noted that, to execute the algorithms, the cockpit display system 100 further includes a first light sensor LSR1 disposed corresponding to the driver's seat DS (or the first display apparatus 111), a second light sensor LSR2 disposed corresponding to the passenger seat PSS (or the second display apparatus 112) and an eye tracking module 150 disposed corresponding to the driver's seat DS and the passenger seat PSS. The first light sensor LSR1 and the second light sensor LSR2 are arranged along the arrangement direction AD of the driver's seat DS and the passenger seat PSS, and are suitable for detecting the ambient light brightness surrounding the cockpit CP.

The eye tracking module 150 is suitable for detecting the binocular position or the visual direction of the driver DR on the driver's seat DS or the co-pilot (that is, the passenger) on the passenger seat PSS. For example, the eye tracking module 150 may include a first camera component 151 disposed corresponding to the driver's seat DS and a second camera component 152 disposed corresponding to the passenger seat PSS. To perform the detection in the dim cockpit CP, the eye tracking module 150 may further optionally include an infrared (IR) light source, without being limited thereto.

The control unit 200 may optionally execute a specific algorithm according to the ambient light brightness obtained by the first light sensor LSR1 and the second light sensor LSR2 or the binocular position or the visual direction of the driver DR or the co-pilot (not illustrated) obtained by the eye tracking module 150 in order to actively adjust the brightness of the display screen or the position of the display content on the screen. The algorithm mentioned hereafter may be, for example, the calibration module 210, the brightness distribution calculation module 230 and the image adjusting module 290 of the control unit 200.

Exemplary descriptions as to how the cockpit display system 100 adjusts the display brightness of the display apparatus or the display device in various situations are hereinafter demonstrated as follows.

Figure 4:
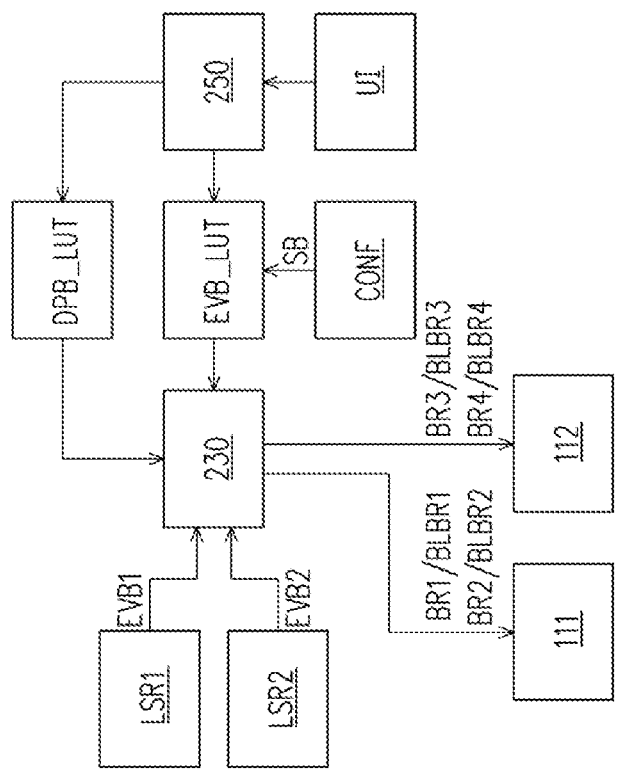
FIG. 4 is a flowchart of the brightness distribution calculation module of FIG. 2 in operation.
Figure 5A:
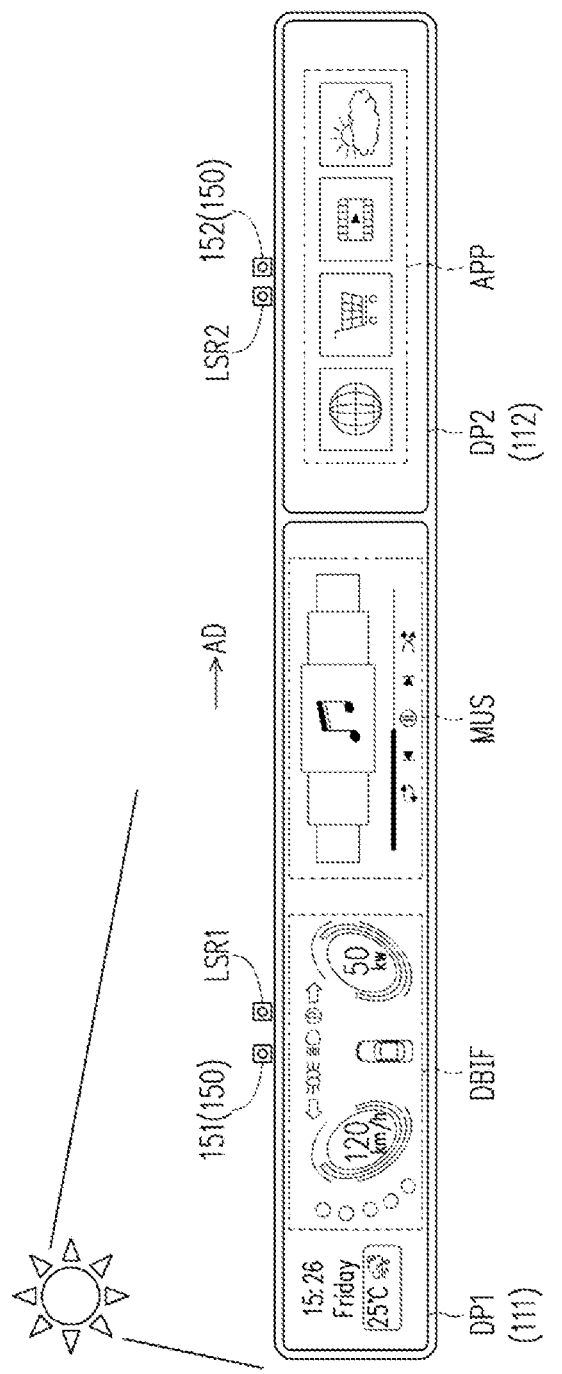
FIG. 5A and FIG. 5B are schematic views of the operation of the first display apparatus and the second display apparatus of FIG. 1 under external sunlight illumination.
Figure 5B:
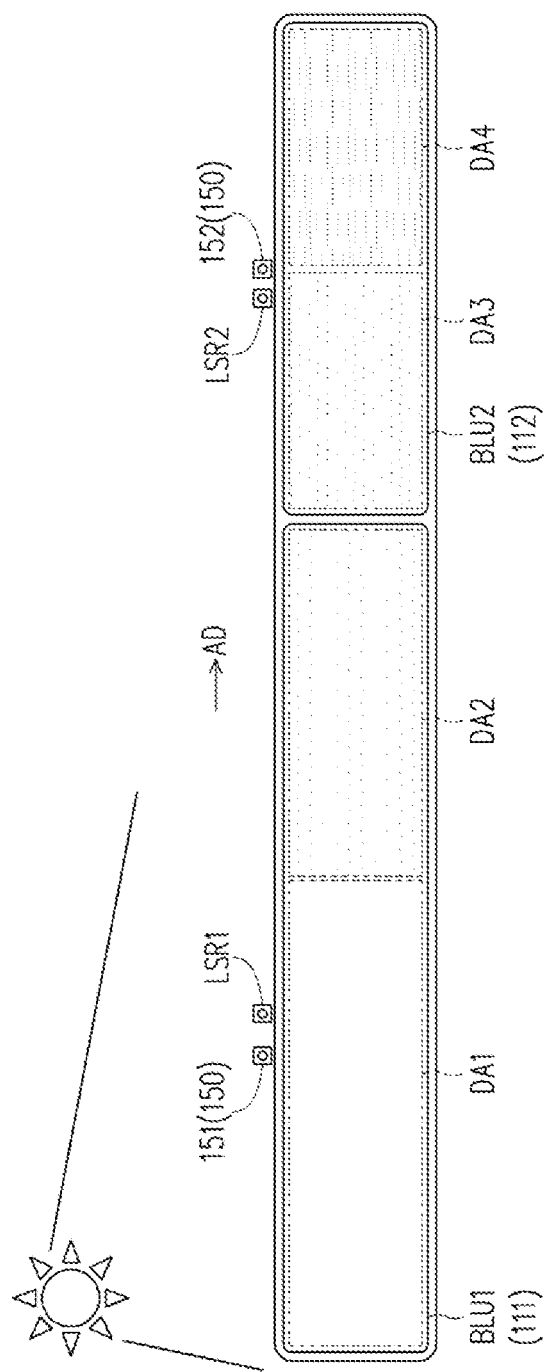
Figure 6:
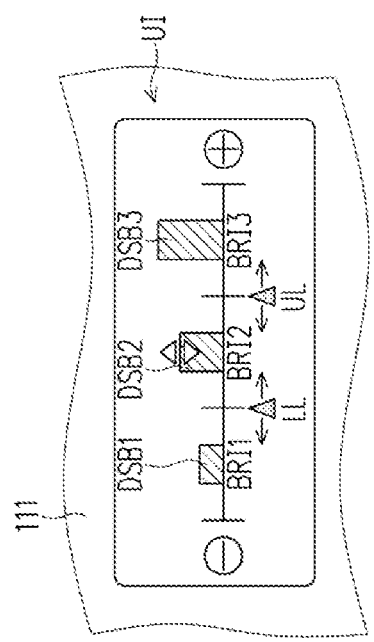
FIG. 6 is a schematic view of the brightness interval adjusting module of FIG. 4 being configured utilizing a user interface.

FIG. 4 is a flowchart of the brightness distribution calculation module of FIG. 2 in operation. FIG. 5A and FIG. 5B are schematic views of the operation of the first display apparatus and the second display apparatus of FIG. 1 under external sunlight illumination. FIG. 6 is a schematic view of the brightness interval adjusting module of FIG. 4 being configured utilizing a user interface.

Referring to FIG. 4, FIG. 5A and FIG. 5B, the first display apparatus 111 includes a first backlight module BLU1 and a first non-self-luminous display panel DP1 disposed to overlap with each other, and has a first display area DA1 and a second display area DA2. The second display apparatus 112 includes a second backlight module BLU2 and a second non-self-luminous display panel DP2 disposed to overlap with each other, and has a third display area DA3 and a fourth display area DA4. The second display area DA2 is located between the first display area DA1 and the third display area DA3, and the third display area DA3 is located between the second display area DA2 and the fourth display area DA4.

The brightness distribution calculation module 230 is suitable for respectively calculating a first brightness BR1, a second brightness BR2, a third brightness BR3 and a fourth brightness BR4 of the first display area DA1 and the second display area DA2 of the first display apparatus 111 and the third display area DA3 and the fourth display area DA4 of the second display apparatus 112 under a same display gray level (such as a first display gray level) according to the first ambient light brightness EVB1 detected by the first light sensor LSR1 and the second ambient light brightness EVB2 detected by the second light sensor LSR2. It should be noted that, when the first ambient light brightness EVB1 is different from the second ambient light brightness EVB2, the first brightness BR1, the second brightness BR2, the third brightness BR3 and the fourth brightness BR4 are different from each other.

More specifically, since the first display apparatus 111 and the second display apparatus 112 in the present embodiment are respectively formed by a combination of a non-self-luminous display panel and a backlight module, the brightness distribution calculation module 230 actually calculates a first backlight brightness BLBR1 and a second backlight brightness BLBR2 of the first backlight module BLU1 respectively in the first display area DA1 and the second display area DA2 and a third backlight brightness BLBR3 and a fourth backlight brightness BLBR4 of the second backlight module BLU2 respectively in the third display area DA3 and the fourth display area DA4 according to the first ambient light brightness EVB1 and the second ambient light brightness EVB2. When the first ambient light brightness EVB1 is different from the second ambient light brightness EVB2, the first backlight brightness BLBR1, the second backlight brightness BLBR2, the third backlight brightness BLBR3 and the fourth backlight brightness BLBR4 are different from each other.

However, the present disclosure is not limited thereto. In other embodiments, the first display apparatus and the second display apparatus may be self-luminous display panels, and brightness for each display area calculated by the brightness distribution calculation module 230 are the self-luminous brightness of the display panels.

In detail, in the process of calculating the brightness for each display area, the brightness distribution calculation module 230 may further be suitable for classifying the first ambient light brightness EVB1 and the second ambient light brightness EVB2 according to a standard brightness SB in the system factory default configuration CONF. The classifying of the ambient light may be performed based on an ambient light brightness interval lookup table EVB_LUT, and the ambient light brightness interval lookup table EVB_LUT may be generated according to the standard brightness SB. Referring to FIG. 3, it should be particularly noted that, in the present embodiment, the calibration module 210 of control unit 200 is used for performing calibration to the standard brightness SB in the default configuration CONF before shipment of the system. In the calibrating process, the first light sensor LSR1 and the second light sensor LSR2 are suitable for detecting an ambient light calibration brightness CB, and the calibration module 210 may adjust the standard brightness SB according to the ambient light calibration brightness CB. For example, when the ambient light calibration brightness CB is not equal to the predetermined standard brightness SB, the ambient light calibration brightness CB functions as the calibrated standard brightness SB and is written in the configuration CONF.

Referring to FIG. 4, FIG. 5A and FIG. 5B, for example, in the present embodiment, the ambient light brightness may be divided into three brightness intervals, such as a first brightness interval BRI1, a second brightness interval BRI2 and a third brightness interval BRI3 of FIG. 6, without being limited thereto. An ambient light brightness of the second brightness interval BRI2 is greater than an ambient light brightness of the first brightness interval BRI1 and is less than an ambient light brightness of the third brightness interval BRI3. The standard brightness SB is located within the second brightness interval BRI2. The ambient light brightness interval lookup table EVB_LUT defines the ambient light brightness ranges respectively corresponding to the first brightness interval BRI1, the second brightness interval BRI2 and the third brightness interval BRI3.

After completing the classifying of the first ambient light brightness EVB1 and the second ambient light brightness EVB2, the brightness distribution calculation module 230 calculates the first brightness BR1 and the second brightness BR2 of the first display apparatus 111 and the third brightness BR3 and the fourth brightness BR4 of the second display apparatus 112 (or the first backlight brightness BLBR1 and the second backlight brightness BLBR2 of the first backlight module BLU1 and the third backlight brightness BLBR3 and the fourth backlight brightness BLBR4 of the second backlight module BLU2).

For example, when the first ambient light brightness EVB1 is located within the third brightness interval BRI3 and the second ambient light brightness BRI2 is located within the second brightness interval BRI2 or the first brightness interval BRI1, the brightness distribution calculation module 230 calculates the first brightness BR1, the second brightness BR2, the third brightness BR3 and the fourth brightness BR4 according to a third display setting brightness corresponding to the third brightness interval BRI3 and a second display setting brightness corresponding to the second brightness interval BRI2 or a first display setting brightness corresponding to the first brightness interval BRI1, where the second brightness BR2 is greater than the third brightness BR3 and less than the first brightness BR1, and the fourth brightness BR4 is less than the third brightness BR3. In the present embodiment, the corresponding relationship between the different brightness intervals of the ambient light and the display setting brightness of the display apparatus may be defined in a panel brightness configuration lookup table DPB_LUT, without being limited thereto.

In other words, when the first ambient light brightness EVB1 is greater than the second ambient light brightness EVB2, the brightness of each display area of the first display apparatus 111 and the second display apparatus 112 is listed sequentially in a descending order as the first brightness BR1 of the first display area DA1, the second brightness BR2 of the second display area DA2, the third brightness BR3 of the third display area DA3 and the fourth brightness BR4 of the fourth display area DA4.

When an external light source (such as sunlight) illuminates from one side of the first display apparatus 111, the backlight brightness of each display area is listed sequentially in a descending order as the first backlight brightness BLBR1 of the first display area DA1, the second backlight brightness BLBR2 of the second display area DA2, the third backlight brightness BLBR3 of the third display area DA3 and the fourth backlight brightness BLBR4 of the fourth display area DA4 (as shown in FIG. 5B). In other words, the backlight brightnesses of the first backlight module BLU1 and the second backlight module BLU2 decreases from the side closer to sunlight to the side farther away from sunlight (that is, it exhibits a gradient distribution).

The increases of the backlight brightness at the side closer to sunlight may effectively improve, for example, the visibility of the dashboard information DBIF displayed in the first display area DA1 by the first display apparatus 111 under the strong external light illumination. Since the third display area DA3 and the fourth display area DA4 of the second display apparatus 112 are located at the side farther away from sunlight, even if the backlight brightness thereof is lower than the backlight brightness of the first display area DA1, the interactive content displayed on the second display apparatus 112 (such as a plurality of applications APP) may still have the visibility comparable to the dashboard information DBIF.

For example, when a vehicle equipped with the cockpit display system 100 of the present embodiment (as shown in FIG. 1) is driving on the road and encounters significant changes in the external ambient light, the detection result of the light sensors may trigger the brightness distribution calculation module 230 of the control unit 200 to perform the calculation process according to the ambient light brightness currently detected, and updates the backlight brightness distribution of the first display apparatus 111 and the second display apparatus 112 in real-time, thus optimizing the visual experience of the driver and the passenger under different ambient brightness conditions.

Further, to allow the user (such as the driver of the vehicle) to set the brightness intervals for the ambient light classification after the shipment of the cockpit display system 100, the control unit 200 may optionally include a brightness interval adjusting module 250. Referring to FIG. 4 and FIG. 6, the brightness interval adjusting module 250 is suitable for adjusting respective interval upper limits UL and interval lower limits LL of the first brightness interval BRI1, the second brightness interval BRI2 and the third brightness interval BRI3 according to setting of the user on the user interface UI.

In addition, the user may adjust the first display setting brightness DSB1 corresponding to the first brightness interval BRI1, the second display setting brightness DSB2 corresponding to the second brightness interval BRI2 and the third display setting brightness DSB3 corresponding to the third brightness interval BRI3 through the user interface UI. For example, the user interface UI may be displayed on at least one of the first display apparatus 111 and the second display apparatus 112, without being limited thereto.

Figure 7:
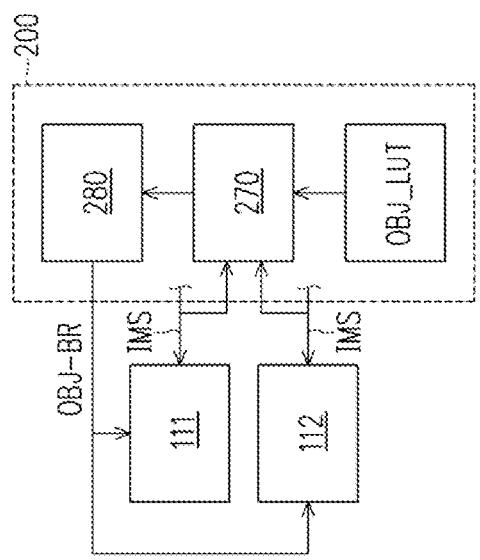
FIG. 7 is a flowchart of the object analysis module and the brightness adjusting module of FIG. 2 in operation.
Figure 8A:
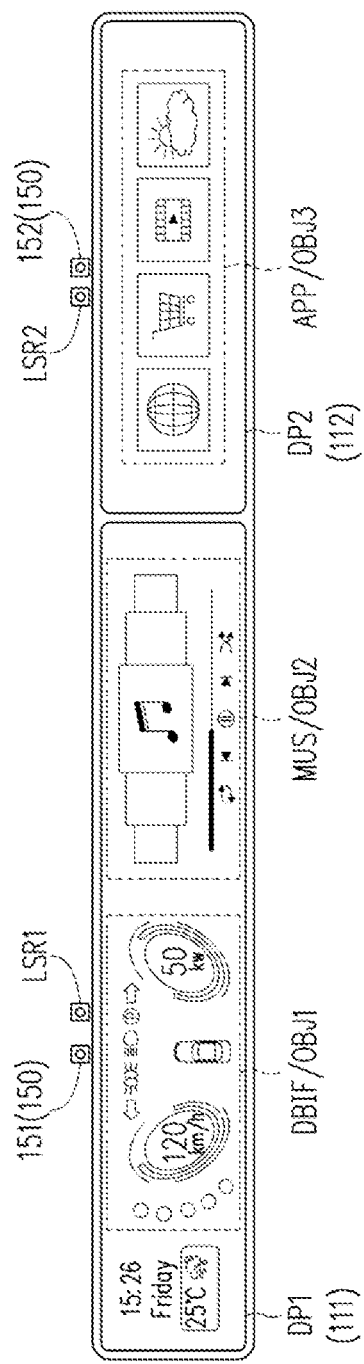
FIG. 8A and FIG. 8B are schematic views of the operation of the first display apparatus and the second display apparatus of FIG. 1 with display objects with different importance.
Figure 8B:
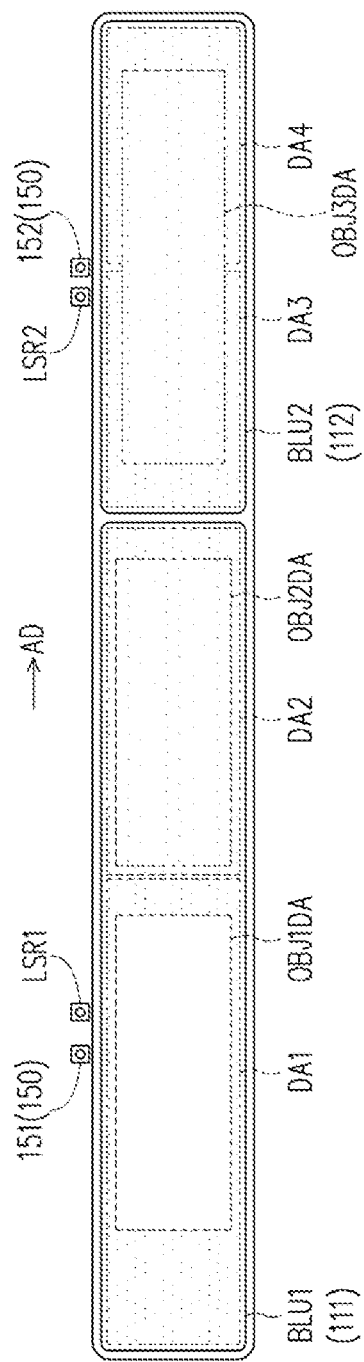

FIG. 7 is a flowchart of the object analysis module and the brightness adjusting module of FIG. 2 in operation. FIG. 8A and FIG. 8B are schematic views of the operation of the first display apparatus and the second display apparatus of FIG. 1 with display objects with different importance. Referring to FIG. 7, FIG. 8A and FIG. 8B, in the present embodiment, the control unit 200 may further include an object analysis module 270 and a brightness adjusting module 280, which are suitable for classifying the importance of the image contents of the first display apparatus 111 and the second display apparatus 112 and enhancing the display effect of certain contents.

The object analysis module 270 is suitable for analyzing image signals IMS of the first display apparatus 111 and the second display apparatus 112 to obtain importance of a display object and the corresponding display area thereof. For example, in the present embodiment, the object analysis module 270 may perform real-time analysis to the display contents on the first display apparatus 111 and the second display apparatus 112 in FIG. 8A, and distinguish, for example, the display object OBJ1 (such as the dashboard information DBIF) located in the display area OBJ1DA, the display object OBJ2 (such as a music controller MUS) located in the display area OBJ2DA, and the display object OBJ3 (such as an application APP) located in the display area OBJ3DA. The display area of each display object may overlap with at least one of the first display area DA1, the second display area DA2, the third display area DA3 and the fourth display area DA4.

After obtaining the quantity and type of the display object, the object analysis module 270 may further perform classification of the importance of the display object. For example, in the present embodiment, the analyzing step of the importance of the display objects may include: performing classification of the importance of the display objects according to an object importance lookup table OBJ_LUT, such as setting the respective importance of the display object OBJ1, the display object OBJ2 and the display object OBJ3 as high importance, mid importance and low importance, without being limited thereto.

After completing the classification of the importance of the display object, the brightness adjusting module 280 may adjust the brightness OBJ-BR of at least one of the first display apparatus 111 and the second display apparatus 112 in the display area of the display object according to the importance of the display object. In the present embodiment, the brightness adjusting amplitude of the brightness adjusting module 280 to the display area of each display object with different importance may be different. For example, the brightness of the display area of the display object with high importance is increased by 10%, the brightness of the display area of the display object with mid importance is increased by 5%, and the brightness of the display area of the display object with low importance is decreased by 10%, without being limited thereto.

Figure 9:
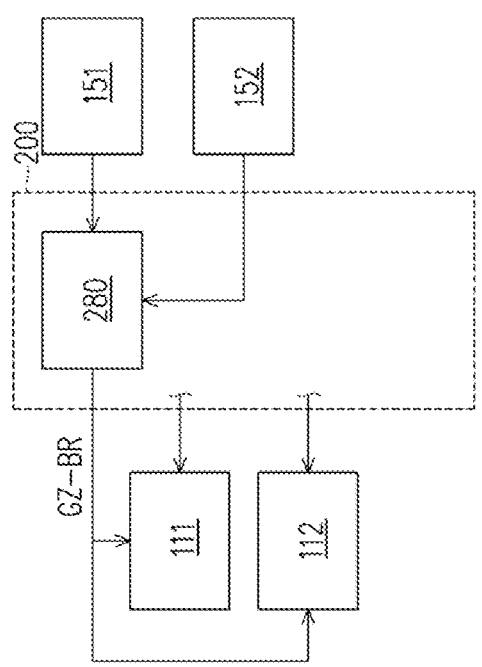
FIG. 9 is a flowchart of the operation of the brightness adjusting module of FIG. 2 in operation.
Figure 10A:
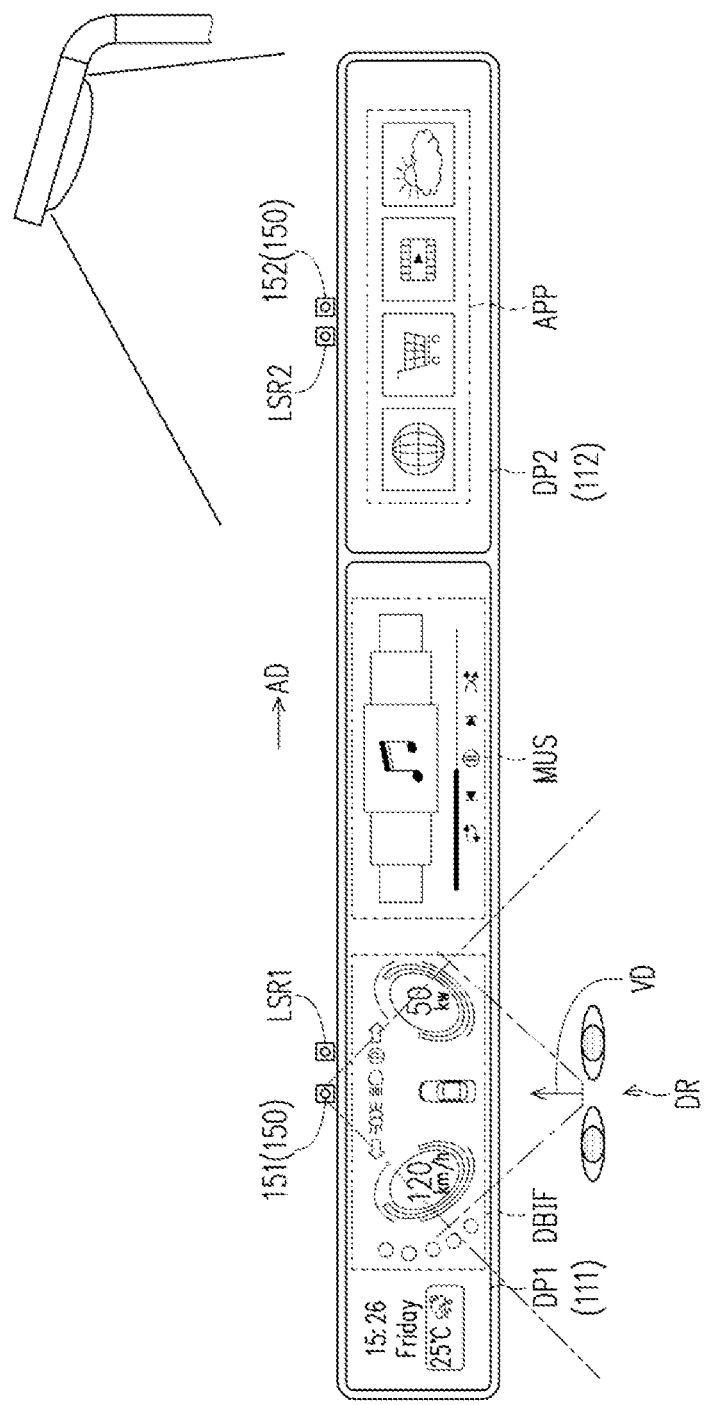
FIG. 10A and FIG. 10B are schematic views of the operation of the first display apparatus and the second display apparatus of FIG. 1 under streetlight illumination.
Figure 10B:
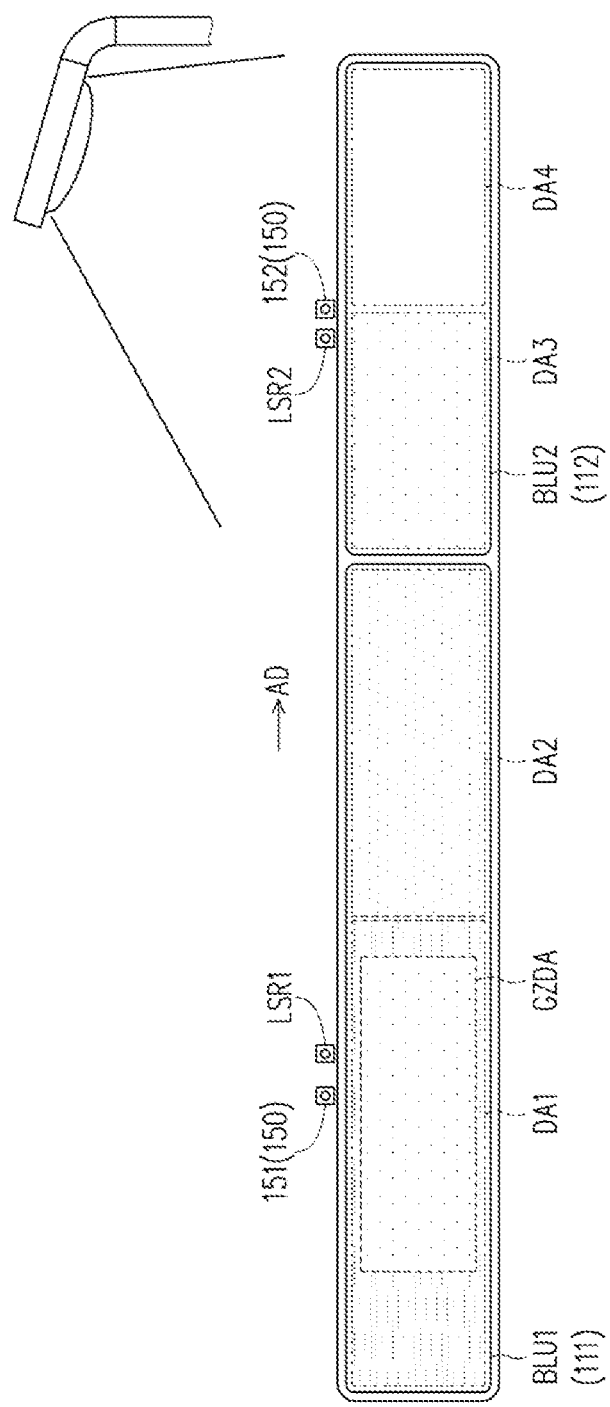

FIG. 9 is a flowchart of the operation of the brightness adjusting module of FIG. 2 in operation. FIG. 10A and FIG. 10B are schematic views of the operation of the first display apparatus and the second display apparatus of FIG. 1 under streetlight illumination. Referring to FIG. 9, FIG. 10A and FIG. 10B, in the present embodiment, the brightness adjusting module 280 of the control unit 200 may be further suitable for actively adjusting the brightness of the display area gazed by the user (such as the driver or the passenger) according to a visual direction VD of the user obtained by the eye tracking module 150.

For example, the first camera component 151 of the eye tracking module 150 may be used to detect the visual direction VD of the eyes of the driver DR. When the visual direction VD of the driver DR falls on the dashboard information DBIF (that is, the display area of the first display apparatus 111 displaying the dashboard DBIF is a gazing area GZDA), the brightness adjusting module 280 may actively adjust the brightness GZ-BR of the gazing area GZDA on the first display apparatus 111 gazed by the driver DR. The gazing area GZDA overlaps with at least one of the first display area DA1, the second display area DA2, the third display area DA3 and the fourth display area DA4. In the present embodiment, the brightness adjustment of the gazing area GZDA may be adjusting the backlight brightness of the first backlight module BLU1 of the first display apparatus 111 at the gazing area GZDA, without being limited thereto.

It is understandable that the second camera component 152 of the eye tracking module 150 may also be used in detecting the visual direction of the eyes of the passenger on the passenger seat, and the brightness adjusting module 280 may further be suitable for adjusting the brightness of the display area of the display apparatus being gazed according to the visual direction of the passenger.

It should be noted that the first display apparatus 111 and the second display apparatus 112 in FIG. 10A may perform displaying at night, and the vehicle in motion is illuminated by streetlights at the side of the second display apparatus 112. Thus, the first ambient light brightness detected by the first light sensor LSR1 is less than the second ambient light brightness detected by the second light sensor LSR2, and the brightness of each display area of the first display apparatus 111 and the second display apparatus 112 is listed sequentially in an ascending order as the first brightness BR1 of the first display area DA1, the second brightness BR2 of the second display area DA2, the third brightness BR3 of the third display area DA3 and the fourth brightness BR4 of the fourth display area DA4.

By gradually reducing the backlight brightness of the first display apparatus 111 and the second display apparatus 112 in the direction away from the streetlights, it is possible to prevent the driver DR from being affected by the overly bright screen brightness in the dim environment and affecting driving safety. The brightness adjustment of each display area is implemented based on the operation of the brightness distribution calculation module 230 as shown in FIG. 4, and the detailed description thereof may be referenced to the previous corresponding paragraphs, without being hereinafter elaborated.

It should be noted that, in the present scenario, the brightness adjustment of the brightness adjusting module 280 to the first display apparatus 111 at the gazing area GZDA may be performed on the brightness distribution after the brightness distribution calculation module 230 adjusts the brightness of the display apparatus according to the change of the ambient light. That is, the brightness adjustments for different needs may be stacked. For example, the brightness adjusting module 280 may, based on the brightness calculated by the brightness distribution calculation module 230 for the first display area DA1, increase the brightness of the gazing area GZDA being gazed in the first display area DA1 by a predetermined increment (such as 10%), thereby optimizing the display effect of the dashboard information DBIF in the dim environment.

Figure 11:
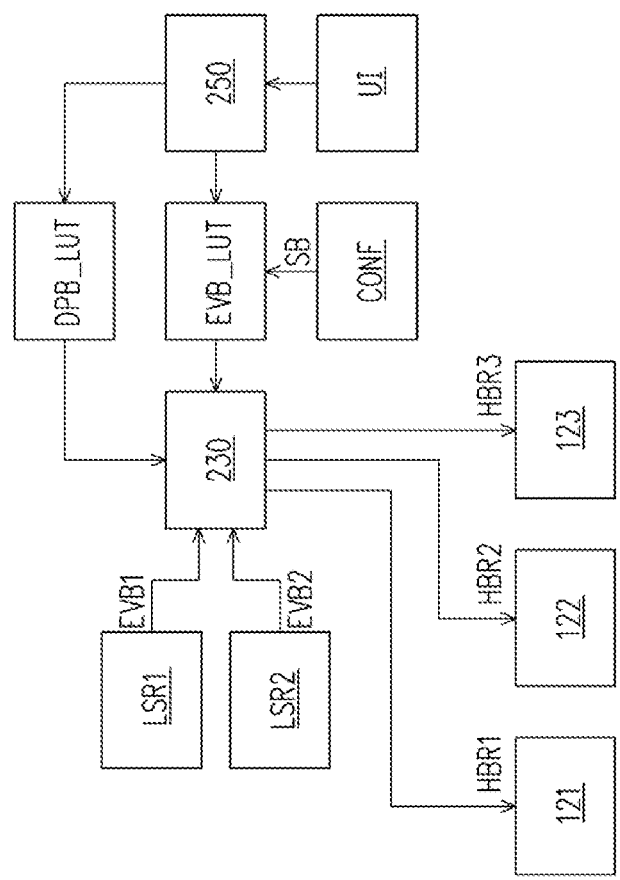
FIG. 11 is a flowchart of the head-up display devices and the brightness distribution calculation module of FIG. 2 in operation.

FIG. 11 is a flowchart of the head-up display devices and the brightness distribution calculation module of FIG. 2 in operation. FIG. 12 is a schematic view of the head-up display devices of FIG. 1 under streetlight illumination. Referring to FIG. 11 and FIG. 12, the light adjusting method for the first display apparatus 111 and the second display apparatus 112 may also apply to the head-up display devices. That is, the brightness distribution calculation module 230 may further calculate the brightnesses of the respective display areas of the head-up display devices under a same display gray level (that is, a second display gray level) according to the first ambient light brightness EVB1 and the second ambient light brightness EVB2 detected by the first light sensor LSR1 and the second LSR2. When the first ambient light brightness EVB1 is different from the second ambient light brightness EVB2, the brightnesses of the respective display areas of the head-up display devices are different from each other.

For example, the first head-up display device 121, the second head-up display device 122 and the third head-up display device 123 in FIG. 12 may perform displaying at night, and the vehicle in motion is illuminated by streetlights at the side away from the first head-up display device 121. Thus, the first ambient light brightness EVB1 detected by the first light sensor LSR1 is less than the second ambient light brightness EVB2 detected by the second light sensor LSR2. The respective brightnesses of the first display area HDA1 of the first head-up display device 121, the second display area HDA2 of the second head-up display device 122 and the third display area HDA3 of the third head-up display device 123 are listed sequentially in an ascending order as the first brightness HBR1 of the first display area HDA1, the second brightness HBR2 of the second display area HDA2 and the third brightness HBR3 of the third display area HDA3.

By gradually reducing the brightnesses of the first display area HDA1 of the first head-up display device 121, the second display area HDA2 of the second head-up display device 122 and the third display area HDA3 of the third head-up display device 123 in the direction away from the streetlights, it is possible to prevent the driver DR from being affected by the overly bright screen brightness in the dim environment and affecting driving safety. The brightness adjustment of each display area (as shown in FIG. 11) is implemented based on the operation of the brightness distribution calculation module 230 as shown in FIG. 4, and the detailed description thereof may be referenced to the previous corresponding paragraphs, without being hereinafter elaborated.

It should be particularly noted that, in the present embodiment, the first head-up display device 121, the second head-up display device 122 and the third head-up display device 123 may display the image information IM1 such as a guiding indicator (such as the right turn indicator as shown in FIG. 12) in a stitching manner along the arrangement direction, without being limited thereto. In other usage scenarios, the head-up display devices may respectively display different image information independently.

Figure 13:
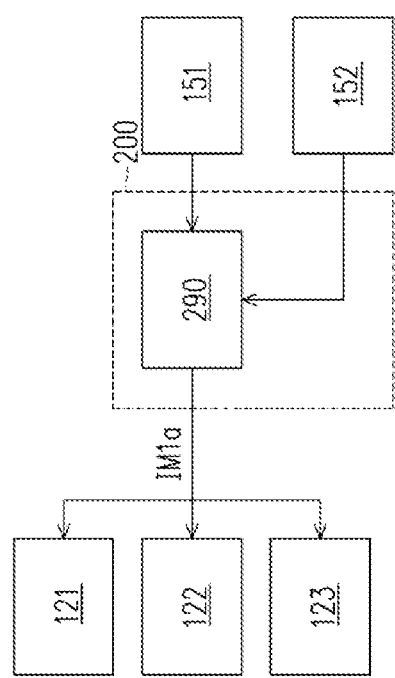
FIG. 13 is a flowchart of the operation of the image adjusting module of FIG. 2 in operation.
Figure 14:
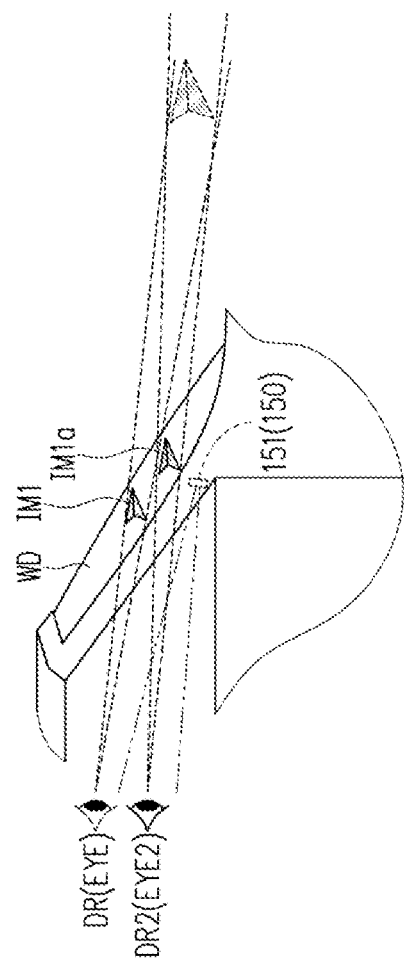
FIG. 14 is a side schematic view of the head-up display devices of FIG. 2 when the image adjusting module is in operation.

FIG. 13 is a flowchart of the operation of the image adjusting module of FIG. 2 in operation. FIG. 14 is a side schematic view of the head-up display devices of FIG. 2 when the image adjusting module is in operation. Referring to FIG. 13 and FIG. 14, in the present embodiment, the control unit 200 may further optionally include an image adjusting module 290, which is suitable for adjusting a display position of the image information IM1 of the first head-up display device 121, the second head-up display device 122 and the third head-up display device 123 on the see-through window WD according to the binocular position of the user (such as the driver DR) obtained by the eye tracking module 150. Thus, the image information IM1 (such as the guiding indicator) may be appropriately integrated into the real scene, thus enhancing the immersive visual experience of the user.

Referring to FIG. 13 and FIG. 14, from another perspective, the adjusting mechanism of the image adjusting module 290 may apply to drivers of different heights. More specifically, when the same vehicle is operated by the drivers of different heights, the image adjusting module 290 may be utilized to display the image information on the head-up display devices at the corresponding position.

For example, when the vehicle is operated by a driver DR who is taller, the image adjusting module 290 may display the image information IM1 on the see-through window WD at a first position that overlaps with the road surface according to the height of the eyes EYE thereof. When the vehicle is instead operated by a driver DR2 who is shorter, the image adjusting module 290 may display the image information IM1a on the see-through window WD at a second position that overlaps with the road surface according to the height of the eyes EYE2 thereof. Since the driver DR2 is shorter, the second position of the image information IM1a being displayed on the see-through window WD is lower than the first position of the image information IM1 being displayed on the see-through window WD.

Figure 15:
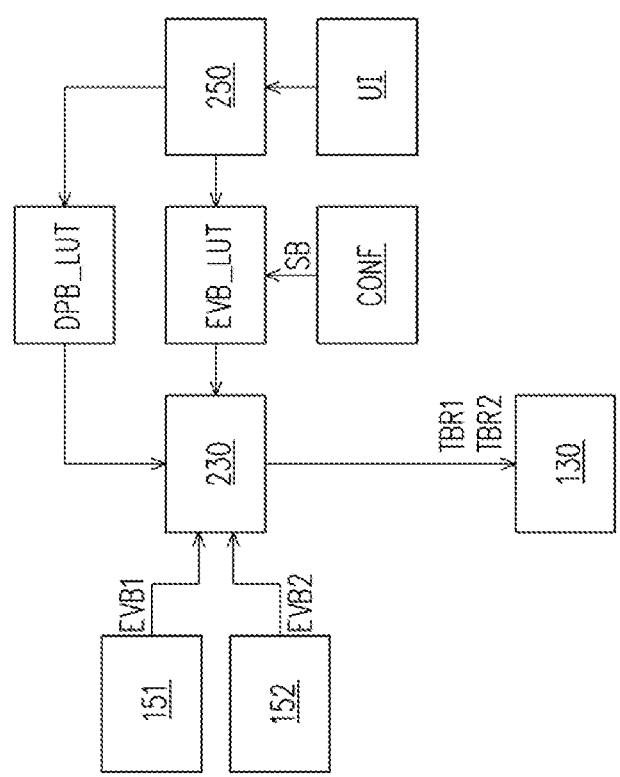
FIG. 15 is a flowchart of the transparent display device and the brightness distribution calculation module of FIG. 2 in operation.
Figure 16:
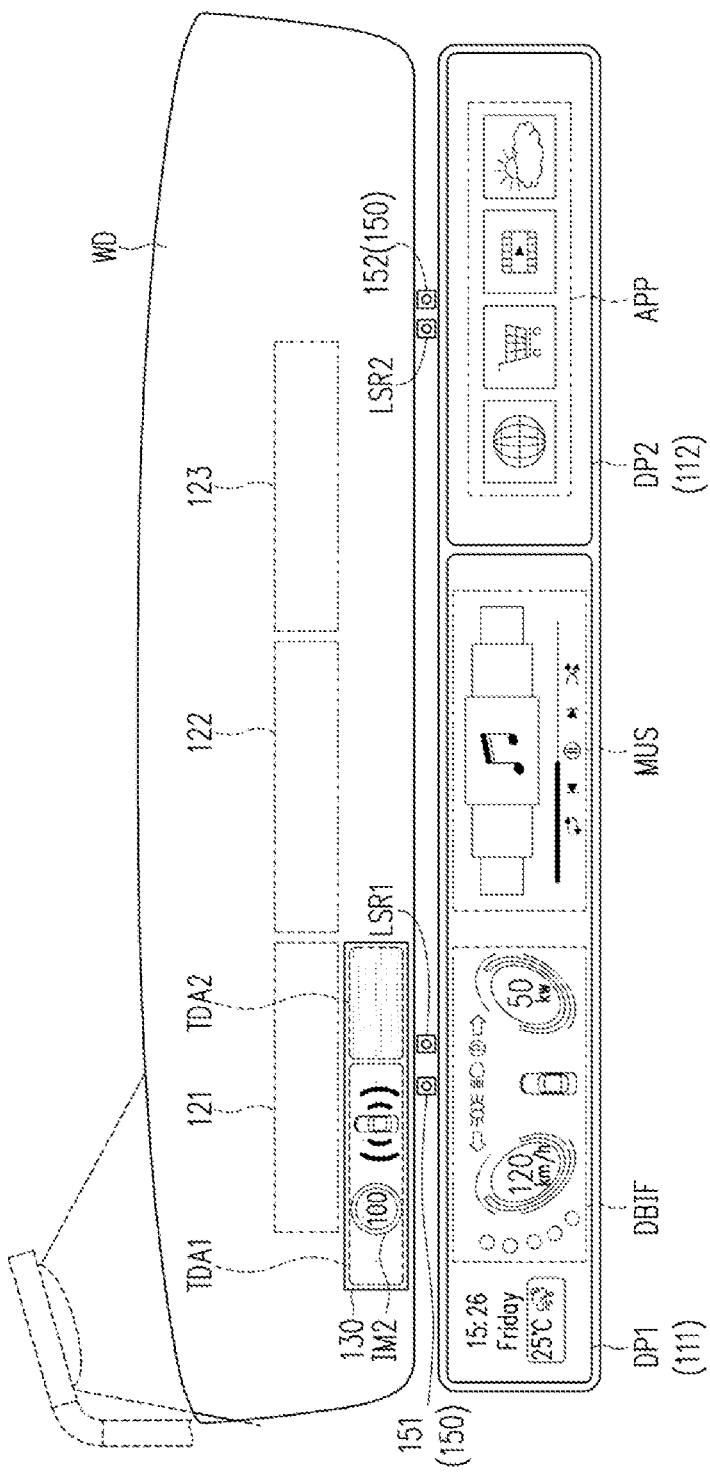
FIG. 16 is a schematic view of the operation of the transparent display device of FIG. 1 under streetlight illumination.

FIG. 15 is a flowchart of the transparent display device and the brightness distribution calculation module of FIG. 2 in operation. FIG. 16 is a schematic view of the operation of the transparent display device of FIG. 1 under streetlight illumination. Referring to FIG. 15 and FIG. 16, the light adjusting method for the first display apparatus 111 and the second display apparatus 112 may also apply to the transparent display device 130. That is, the brightness distribution calculation module 230 may further calculate the brightnesses of the respective display areas of the transparent display device 130 under a same display gray level (that is, the second display gray level) according to the first ambient light brightness EVB1 and the second ambient light brightness EVB2 detected by the first light sensor LSR1 and the second LSR2. When the first ambient light brightness EVB1 is different from the second ambient light brightness EVB2, the brightnesses of the respective display areas of the transparent display device 130 are different from each other. In the present embodiment, the transparent display device 130 may have a first transparent display area TDA1 and a second transparent display area TDA2 arranged along the arrangement direction AD.

For example, the transparent display device 130 in FIG. 16 may perform displaying at night, and the vehicle in motion is illuminated by streetlights at the side of the transparent display device 130. Thus, the first ambient light brightness EVB1 detected by the first light sensor LSR1 is greater than the second ambient light brightness EVB2 detected by the second light sensor LSR2. Thus, a first display brightness TBR1 of the first transparent display area TDA1 of the transparent display device 130 being calculated by the brightness distribution calculation module 230 is greater than a second display brightness TBR2 of the second transparent display area TDA2 being calculated.

By gradually reducing the display brightness of the transparent display device 130 in the direction away from the streetlights, it is possible to prevent the driver DR from being affected by the overly bright screen brightness in the dim environment and affecting driving safety. The brightness adjustment of each display area of the transparent display device 130 (as shown in FIG. 15) is also implemented based on the operation of the brightness distribution calculation module 230 as shown in FIG. 4, and the detailed description thereof may be referenced to the previous corresponding paragraphs, without being hereinafter elaborated.

Figure 17:
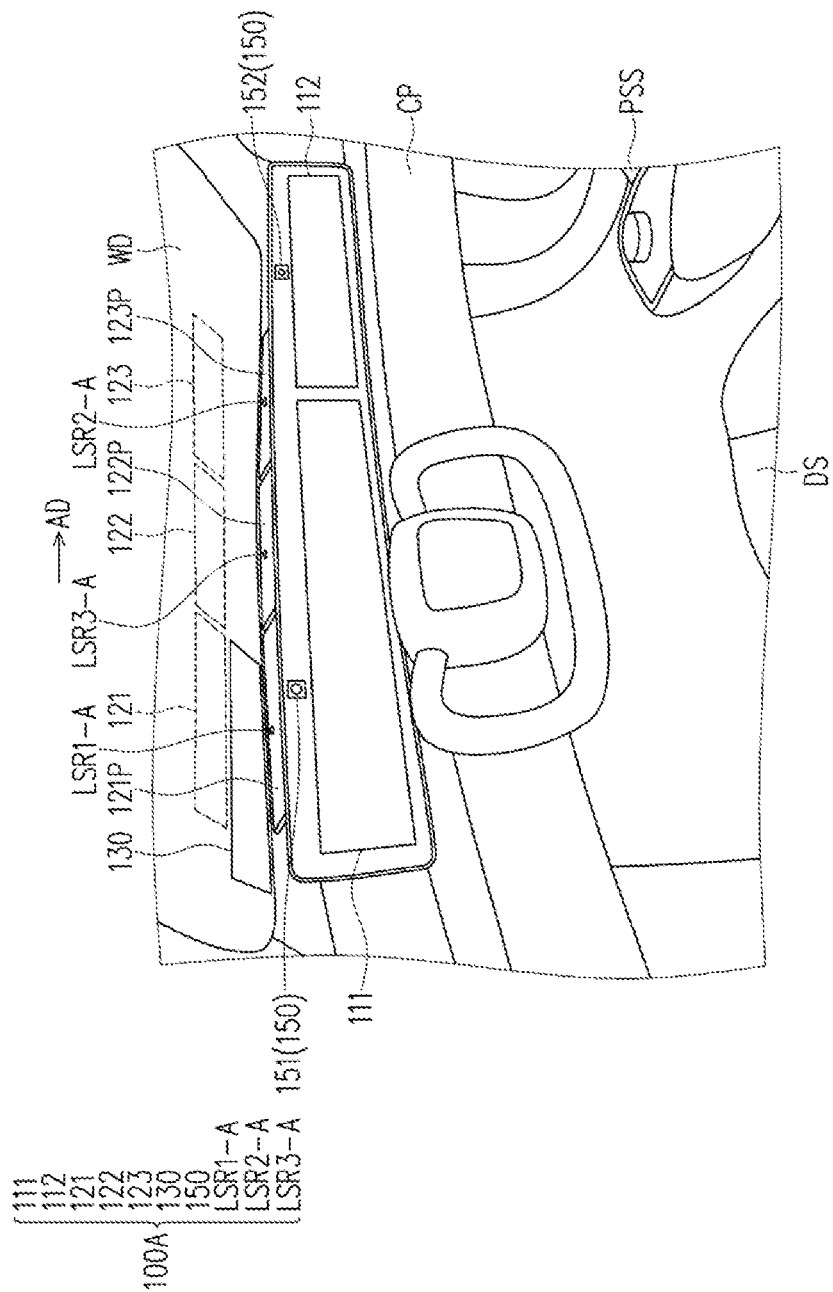
FIG. 17 is a schematic view of a cockpit display system according to another embodiment of the present disclosure.

FIG. 17 is a schematic view of a cockpit display system according to another embodiment of the present disclosure. Referring to FIG. 17, the major difference between the cockpit display system 100A in the present embodiment and the cockpit display system 100 of FIG. 1 exists in that the disposing positions of the light sensors are different. Specifically, in the present embodiment, the light sensors may be disposed on the projection machines of the head-up display devices. For example, the first projection machine 121P and the third projection machine 123P are respectively provided with the first light sensor LSR1-A and the second light sensor LSR2-A.

The operations of the first light sensor LSR1-A and the second light sensor LSR2-A are similar to those of the first light sensor LSR1 and the second light sensor LSR2 of FIG. 1, and the detailed description thereof may be referenced to the previous corresponding paragraphs, without being hereinafter elaborated. However, the present disclosure is not limited thereto. In other embodiments that are not illustrated, the transparent display device 130 may be provided with a light sensor to meet the adjustment needs of the transparent display device 130 on the brightness distribution.

It should be noted that, in the present embodiment, the cockpit display system 100A further includes a third light sensor LSR3-A disposed on the second projection machine 122P. For example, the first light sensor LSR1-A, the third light sensor LSR3-A and the second light sensor LSR2-A are respectively suitable for detecting the ambient light brightness in the left front, middle front and right front of the cockpit CP. The control unit may selectively execute a certain algorithm according to the ambient light brightnesses obtained by the three light sensors to actively adjust the brightness of the screen. The algorithm mentioned hereafter may be, for example, the calibration module 210 and the brightness distribution calculation module 230 of the control unit 200, and the detailed description thereof may be referenced to the corresponding paragraphs of the previous embodiment, without being hereinafter elaborated.

In sum, in the cockpit display system according to one embodiment of the present disclosure, the first light sensor disposed at a side of the first display apparatus and the second light sensor disposed at a side of the second display apparatus are suitable for detecting the surrounding ambient light brightness. The brightness distribution calculation module may calculate the brightnesses of the display areas of the first display apparatus and the second display apparatus under the same display gray level according to the first ambient light brightness and the second ambient light brightness detected by the two light sensors. Since the relationship of the brightnesses of the display areas changes according to the relationship between the first ambient light brightness and the second ambient light brightness, it can effectively improve the display quality of the cockpit display system under different ambient light sources, thereby optimizing the visual experience of the user.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A cockpit display system, comprising:
    a cockpit;
    a first display apparatus and a second display apparatus, disposed side-by-side in the cockpit along an arrangement direction, wherein the first display apparatus has a first display area and a second display area, the second display apparatus has a third display area and a fourth display area, the second display area is located between the first display area and the third display area, and the third display area is located between the second display area and the fourth display area;
    a first light sensor and a second light sensor, arranged along the arrangement direction, and configured to respectively detect a first ambient light brightness and a second ambient light brightness; and
    a brightness distribution calculation module, configured to respectively calculate a first brightness, a second brightness, a third brightness and a fourth brightness of the first display area, the second display area, the third display area and the fourth display area under a same first display gray level according to the first ambient light brightness and the second ambient light brightness and to classify the first ambient light brightness and the second ambient light brightness according to a standard brightness, wherein when the first ambient light brightness is different from the second ambient light brightness, the first brightness, the second brightness, the third brightness and the fourth brightness are different from each other.

2. The cockpit display system according to claim 1, wherein the first display apparatus comprises a first backlight module and a first non-self-luminous display panel disposed to overlap with each other, the second display apparatus comprises a second backlight module and a second non-self-luminous display panel disposed to overlap with each other, and the brightness distribution calculation module is configured to calculate a first backlight brightness and a second backlight brightness of the first backlight module respectively in the first display area and the second display area and a third backlight brightness and a fourth backlight brightness of the second backlight module respectively in the third display area and the fourth display area according to the first ambient light brightness and the second ambient light brightness, such that the first backlight brightness, the second backlight brightness, the third backlight brightness and the fourth backlight brightness are different from each other.

3. The cockpit display system according to claim 1, further comprising:

a calibration module, wherein the first light sensor and the second light sensor are further configured to detect an ambient light calibration brightness, and the calibration module is configured to adjust the standard brightness according to the ambient light calibration brightness.

4. The cockpit display system according to claim 1, wherein a classifying step of the first ambient light brightness and the second ambient light brightness comprises determining whether the first ambient light brightness and the second ambient light brightness are respectively located within a first brightness interval, a second brightness interval or a third brightness interval, wherein an ambient light brightness of the second brightness interval is greater than an ambient light brightness of the first brightness interval and is less than an ambient light brightness of the third brightness interval, and the standard brightness is located within the second brightness interval.

5. The cockpit display system according to claim 4, wherein the brightness distribution calculation module is configured to calculate the first brightness, the second brightness, the third brightness and the fourth brightness according to a classifying result of the first ambient light brightness and the second ambient light brightness.

6. The cockpit display system according to claim 5, wherein when the first ambient light brightness is located within the third brightness interval and the second ambient light brightness is located within the second brightness interval or the first brightness interval, the brightness distribution calculation module calculates the first brightness, the second brightness, the third brightness and the fourth brightness according to a third display setting brightness corresponding to the third brightness interval and a second display setting brightness corresponding to the second brightness interval or a first display setting brightness corresponding to the first brightness interval, wherein the second brightness is greater than the third brightness and less than the first brightness, and the fourth brightness is less than the third brightness.

7. The cockpit display system according to claim 4, further comprising:
a brightness interval adjusting module, configured to adjust respective interval upper limits and interval lower limits of the first brightness interval, the second brightness interval and the third brightness interval according to setting of a user.

8. The cockpit display system according to claim 7, wherein a first display setting brightness corresponding to the first brightness interval, a second display setting brightness corresponding to the second brightness interval and a third display setting brightness corresponding to the third brightness interval are configured to be adjusted by the user.

9. The cockpit display system according to claim 1, further comprising:
an object analysis module, configured to analyze image signals of the first display apparatus and the second display apparatus to obtain importance and a display area of a display object, wherein the display area of the display object overlaps with at least one of the first display area, the second display area, the third display area and the fourth display area; and
a brightness adjusting module, configured to adjust a brightness of at least one of the first display apparatus and the second display apparatus in the display area of the display object according to the importance of the display object.

10. The cockpit display system according to claim 9, wherein an analyzing step of the importance of the display object comprises: performing classification of the importance of the display object according to an object importance lookup table, and a brightness adjusting amplitude of the brightness adjusting module to the display area of the display object varies depending on the importance of the display object.

11. The cockpit display system according to claim 1, further comprising:
an eye tracking module, disposed corresponding to a driver's seat in the cockpit, and configured to detect a visual direction of a user on the driver's seat; and
a brightness adjusting module, configured to increase a brightness of a gazing area on the first display apparatus or the second display apparatus gazed by the user according to the visual direction of the user, wherein the gazing area overlaps with at least one of the first display area, the second display area, the third display area and the fourth display area.

12. The cockpit display system according to claim 1, further comprising:
a plurality of head-up display devices, disposed in the cockpit, wherein the head-up display devices are configured to display image information on a see-through window of the cockpit, and each of the head-up display devices has a display area,
wherein the brightness distribution calculation module is further configured to calculate brightnesses of the display areas of the head-up display devices under a same second display gray level according to the first ambient light brightness and the second ambient light brightness, and when the first ambient light brightness is different from the second ambient light brightness, the brightnesses of the display areas are different from each other.

13. The cockpit display system according to claim 12, further comprising:
an eye tracking module, disposed corresponding to a driver's seat in the cockpit, and configured to detect a binocular position of a user on the driver's seat; and
an image adjusting module, configured to adjust a display position of the image information of the head-up display devices on the see-through window according to the binocular position of the user.

14. The cockpit display system according to claim 12, wherein the head-up display devices display the image information in a stitching manner along the arrangement direction.

15. The cockpit display system according to claim 1, further comprising:
a transparent display device, disposed to overlap with a see-through window of the cockpit, and having a first transparent display area and a second transparent display area arranged along the arrangement direction,
wherein the brightness distribution calculation module is further configured to respectively calculate a first display brightness and a second display brightness of the first transparent display area and the second transparent display area of the transparent display device under a same second display gray level according to the first ambient light brightness and the second ambient light brightness, and when the first ambient light brightness is different from the second ambient light brightness, the first display brightness is different from the second display brightness.

16. A cockpit display system, comprising:
a cockpit;

a first display apparatus and a second display apparatus, disposed side-by-side in the cockpit along an arrangement direction, wherein the first display apparatus has a first display area and a second display area, the second display apparatus has a third display area and a fourth display area, the second display area is located between the first display area and the third display area, and the third display area is located between the second display area and the fourth display area;

a first light sensor and a second light sensor, arranged along the arrangement direction, and configured to respectively detect a first ambient light brightness and a second ambient light brightness;

a brightness distribution calculation module, configured to respectively calculate a first brightness, a second brightness, a third brightness and a fourth brightness of the first display area, the second display area, the third display area and the fourth display area under a same first display gray level according to the first ambient light brightness and the second ambient light brightness, wherein when the first ambient light brightness is different from the second ambient light brightness, the first brightness, the second brightness, the third brightness and the fourth brightness are different from each other;

an object analysis module, configured to analyze image signals of the first display apparatus and the second display apparatus to obtain importance and a display area of a display object, wherein the display area of the display object overlaps with at least one of the first display area, the second display area, the third display area and the fourth display area; and a brightness adjusting module, configured to adjust a brightness of at least one of the first display apparatus and the second display apparatus in the display area of the display object according to the importance of the display object;

wherein an analyzing step of the importance of the display object comprises:

performing classification of the importance of the display object according to an object importance lookup table, and a brightness adjusting amplitude of the brightness adjusting module to the display area of the display object varies depending on the importance of the display object.

17. The cockpit display system according to claim 16, further comprising:

an eye tracking module, disposed corresponding to a driver's seat in the cockpit, and configured to detect a visual direction of a user on the driver's seat.

18. The cockpit display system according to claim 17, wherein the brightness adjusting module is further configured to increase a brightness of a gazing area on the first display apparatus or the second display apparatus gazed by the user according to the visual direction of the user, wherein the gazing area overlaps with at least one of the first display area, the second display area, the third display area and the fourth display area.

19. The cockpit display system according to claim 16, further comprising:

a plurality of head-up display devices, disposed in the cockpit, wherein the head-up display devices are configured to display image information on a see-through window of the cockpit.

20. A cockpit display system, comprising:

a cockpit;

a first display apparatus and a second display apparatus, disposed side-by-side in the cockpit along an arrangement direction, wherein the first display apparatus has a first display area and a second display area, the second display apparatus has a third display area and a fourth display area, the second display area is located between the first display area and the third display area, and the third display area is located between the second display area and the fourth display area;

a first light sensor and a second light sensor, arranged along the arrangement direction, and configured to respectively detect a first ambient light brightness and a second ambient light brightness;

a plurality of head-up display devices, disposed in the cockpit, wherein the head-up display devices are configured to display image information on a see-through window of the cockpit, and each of the head-up display devices has a display area, a brightness distribution calculation module, configured to respectively calculate a first brightness, a second brightness, a third brightness and a fourth brightness of the first display area, the second display area, the third display area and the fourth display area under a same first display gray level according to the first ambient light brightness and the second ambient light brightness, and to calculate brightnesses of the display areas of the head-up display devices under a same second display gray level according to the first ambient light brightness and the second ambient light brightness;

an eye tracking module, disposed corresponding to a driver's seat in the cockpit, and configured to detect a binocular position of a user on the driver's seat; and an image adjusting module, configured to adjust a display position of the image information of the head-up display devices on the see-through window according to the binocular position of the user, wherein when the first ambient light brightness is different from the second ambient light brightness, the first brightness, the second brightness, the third brightness and the fourth brightness are different from each other, and the brightnesses of the display areas of the head-up display devices are different from each other.

* * * * *